(12) United States Patent
Yamauchi et al.

(10) Patent No.: US 12,495,641 B2
(45) Date of Patent: Dec. 9, 2025

(54) LIGHT-EMITTING ELEMENT, OPTICAL DETECTION MODULE, MANUFACTURING METHOD FOR LIGHT-EMITTING ELEMENT, AND SCANNING ELECTRON MICROSCOPE

(71) Applicant: HAMAMATSU PHOTONICS K.K., Hamamatsu (JP)

(72) Inventors: Kuniyoshi Yamauchi, Hamamatsu (JP); Minoru Kondo, Hamamatsu (JP); Takayuki Nakamura, Hamamatsu (JP); Junya Maeda, Hamamatsu (JP); Satoru Okawara, Hamamatsu (JP)

(73) Assignee: HAMAMATSU PHOTONICS K.K., Shizuoka (JP)

( * ) Notice: Subject to any disclaimer, the term of this patent is extended or adjusted under 35 U.S.C. 154(b) by 265 days.

(21) Appl. No.: 18/270,008

(22) PCT Filed: Nov. 25, 2021

(86) PCT No.: PCT/JP2021/043178
§ 371 (c)(1),
(2) Date: Jun. 28, 2023

(87) PCT Pub. No.: WO2022/163101
PCT Pub. Date: Aug. 4, 2022

(65) Prior Publication Data
US 2024/0063328 A1   Feb. 22, 2024

(30) Foreign Application Priority Data
Jan. 28, 2021   (JP) .................................. 2021-011835

(51) Int. Cl.
*H10H 20/01*   (2025.01)
*G02B 21/00*   (2006.01)
(Continued)

(52) U.S. Cl.
CPC ... *H10H 20/01335* (2025.01); *G02B 21/0076* (2013.01); *H10H 20/018* (2025.01);
(Continued)

(58) Field of Classification Search
CPC .......... H10H 20/01335; H10H 20/018; H10H 20/812; H10H 20/815; H10H 20/825;
(Continued)

(56) References Cited

U.S. PATENT DOCUMENTS

| 6,455,860 B1 | 9/2002 | Mooney |
| 2002/0190219 A1 | 12/2002 | Mooney |

(Continued)

FOREIGN PATENT DOCUMENTS

| CN | 1489704 A | 4/2004 |
| CN | 1946827 A | 4/2007 |

(Continued)

OTHER PUBLICATIONS

International Preliminary Report on Patentability mailed Aug. 10, 2023 for PCT/JP2021/043178.

*Primary Examiner* — Charles S Chang
(74) *Attorney, Agent, or Firm* — Faegre Drinker Biddle & Reath LLP

(57) ABSTRACT

There are provided a light-emitting element, an optical detection module, a method for manufacturing a light-emitting element, and a scanning electron microscope using the same, by which it is possible to reduce crosstalk and expand the range of applications. A light-emitting element includes a fiber optic plate substrate having transparency to fluorescence and a light-emitting layer as a nitride semiconductor layer having a quantum well structure. In the light-emitting element, the fiber optic plate substrate and the light-emitting layer are directly bonded to each other.

16 Claims, 15 Drawing Sheets

(51) Int. Cl.
*H10H 20/812* (2025.01)
*H10H 20/815* (2025.01)
*H10H 20/825* (2025.01)
*H10H 20/856* (2025.01)
*G01N 23/2251* (2018.01)

(52) U.S. Cl.
CPC ........ *H10H 20/812* (2025.01); *H10H 20/815* (2025.01); *H10H 20/825* (2025.01); *H10H 20/856* (2025.01); *G01N 23/2251* (2013.01); *G01N 2223/507* (2013.01); *H10H 20/0363* (2025.01)

(58) Field of Classification Search
CPC ............. H10H 20/856; H10H 20/0363; H10H 20/855; G02B 21/0076; G01N 23/2251; G01N 2223/507; H01J 37/244; H01J 37/28; H01L 25/167; C09K 11/62; G01T 1/20
See application file for complete search history.

(56) References Cited

U.S. PATENT DOCUMENTS

| | | | | |
|---|---|---|---|---|
| 2011/0024775 | A1* | 2/2011 | Zimmerman | H10F 71/1274 257/E33.005 |
| 2019/0027351 | A1 | 1/2019 | Imamura et al. | |

FOREIGN PATENT DOCUMENTS

| | | |
|---|---|---|
| CN | 102113140 A | 6/2011 |
| EP | 0655424 A1 | 5/1995 |
| JP | S62-172691 A | 7/1987 |
| JP | H7-281036 A | 10/1995 |
| JP | 2000-002768 A | 1/2000 |
| JP | 4365255 B2 | 11/2009 |
| JP | 2016-136094 A | 7/2016 |
| JP | 2017-135039 A | 8/2017 |
| JP | 2020-136071 A | 8/2020 |
| KR | 20030085115 A | 11/2003 |
| KR | 20150086913 A | 7/2015 |
| TW | 200409382 A | 6/2004 |
| TW | 202026665 A | 7/2020 |

* cited by examiner (a)

(b)

(a)

(b)

(a)

(b)

(a)

(b)

(c)

LIGHT-EMITTING ELEMENT, OPTICAL DETECTION MODULE, MANUFACTURING METHOD FOR LIGHT-EMITTING ELEMENT, AND SCANNING ELECTRON MICROSCOPE

TECHNICAL FIELD

The present disclosure relates to a light-emitting element, an optical detection module, a method for manufacturing a light-emitting element, and a scanning electron microscope.

BACKGROUND ART

As a conventional light-emitting element, there is a light emitter described in Patent Literature 1, for example. This conventional light emitter is a light emitter that converts incident electrons into fluorescence. The light emitter includes a substrate transparent to fluorescence and a nitride semiconductor layer, which is formed on one surface of the substrate and has a buffer layer and a quantum well structure for generating fluorescence in response to the incidence of electrons. A cap layer formed of a material having a higher bandgap energy than the constituent material of the nitride semiconductor layer is provided on the nitride semiconductor layer.

CITATION LIST

Patent Literature

Patent Literature 1: Japanese Patent No. 4365255

SUMMARY OF INVENTION

Technical Problem

In a conventional light-emitting element, when a nitride semiconductor layer is formed by crystal growth, a sapphire substrate or a GaN substrate is mainly used (for example, see Patent Literature 1 above). These substrates are single crystals. For this reason, there has been a problem that, until some of light beams from a light-emitting layer are extracted into the atmosphere or vacuum after being incident on a substrate and a buffer layer, some of the light beams diffuse through the substrate and the buffer layer as a waveguide and the diffused component can cause crosstalk.

In addition, in the conventional light-emitting element, lens coupling is essential in constructing a multi-channel optical detection module or imaging unit in combination with a multi-channel photodetector or image sensor. For this reason, there has been a problem that it is difficult to miniaturize the detection module or the imaging unit and accordingly the application is likely to be restricted. In addition, in the lens coupling, there is a demand for improving the efficiency of transmitting light from the light-emitting layer to the optical detection module or the imaging unit.

The present disclosure has been made to solve the aforementioned problems, and it is an object of the present disclosure to provide a light-emitting element, an optical detection module, a method for manufacturing a light-emitting element, and a scanning electron microscope using the same by which it is possible to reduce crosstalk and expand the range of applications.

Solution to Problem

A light-emitting element according to one aspect of the present disclosure includes a fiber optic plate substrate having transparency to fluorescence, and a light-emitting layer as a nitride semiconductor layer having a quantum well structure. The fiber optic plate substrate and the light-emitting layer are directly bonded to each other.

In this light-emitting element, the fiber optic plate substrate and the light-emitting layer are directly bonded to each other. In this light-emitting element, unlike a conventional structure in which a light-emitting layer is provided on a sapphire substrate with a buffer layer interposed therebetween, some of light beams incident on the light-emitting element can be prevented from diffusing with the sapphire substrate and the buffer layer as a waveguide. Therefore, it is possible to reduce crosstalk. By using the fiber optic plate substrate instead of the sapphire substrate, it is possible to improve the efficiency of collecting the fluorescence generated in the light-emitting layer. In addition, since it is possible to avoid that lens coupling is essential in constructing the optical detection module, it is possible to expand the range of applications.

The fiber optic plate substrate and the light-emitting layer may be bonded to each other by thermocompression bonding. Therefore, the fiber optic plate substrate and the light-emitting layer can be appropriately directly bonded to each other without using an adhesive.

The fiber optic plate substrate and the light-emitting layer may be bonded to each other by room temperature bonding. Therefore, the fiber optic plate substrate and the light-emitting layer can be appropriately directly bonded to each other without using an adhesive. In addition, in room temperature bonding, the occurrence of distortion in the fiber optic plate substrate due to heat is also suppressed.

Constituent elements of the light-emitting layer may be diffused into the fiber optic plate substrate. In this case, due to the diffusion of the constituent elements of the light-emitting layer into the fiber optic plate substrate, the bonding strength between the fiber optic plate substrate and the light-emitting layer can be sufficiently increased.

The light-emitting layer may have a laminated structure in which a GaN layer and an InGaN layer are alternately laminated. In this case, fluorescence can be efficiently generated in the light-emitting layer. In addition, since the laminated structure is directly bonded to the fiber optic plate substrate, the generated fluorescence can be efficiently extracted to the fiber optic plate substrate side.

A metal layer may be provided on a surface of the light-emitting layer on a side opposite to a bonding surface between the fiber optic plate substrate and the light-emitting layer. Therefore, it is possible to prevent charging when electrons or the like are incident on the light-emitting layer. In addition, by the reflection of light on the metal layer, the generated fluorescence can be efficiently extracted to the fiber optic plate substrate side.

On at least one of the fiber optic plate substrate and the light-emitting layer at a bonding surface between the fiber optic plate substrate and the light-emitting layer, an intermediate layer whose refractive index for the fluorescence is a refractive index between the fiber optic plate substrate and the light-emitting layer may be provided. In this case, by adjusting the refractive index of the intermediate layer, the intermediate layer can function as a functional layer, such as an antireflection film, at the bonding surface between the fiber optic plate substrate and the light-emitting layer.

The intermediate layer may be a SiN layer, a $Ta_3O_5$ layer, a $HfO_2$ layer, or a combination thereof. Therefore, the intermediate layer can function as an antireflection film. In addition, it becomes easy to design a multilayer film containing other high refractive index materials.

An optical detection module according to one aspect of the present disclosure includes the light-emitting element described above, and a photodetector arranged on the fiber optic plate substrate side with respect to the light-emitting element.

In the light-emitting element forming the optical detection module, the fiber optic plate substrate and the light-emitting layer are directly bonded to each other. Therefore, unlike a conventional structure in which a light-emitting layer is provided on a sapphire substrate with a buffer layer interposed therebetween, some of light beams incident on the light-emitting element can be prevented from diffusing with the sapphire substrate and the buffer layer as a waveguide. As a result, it is possible to reduce crosstalk. By using the fiber optic plate substrate instead of the sapphire substrate, it is possible to improve the efficiency of collecting the fluorescence generated in the light-emitting layer. In addition, since it is possible to avoid that lens coupling is essential in constructing the optical detection module, it is possible to expand the range of applications.

The photodetector may be formed by a solid state detection element or an electron tube device. Therefore, the optical detection module can be adapted for various applications.

A method for manufacturing a light-emitting element according to one aspect of the present disclosure includes a light-emitting layer forming step in which a buffer layer and a light-emitting layer as a nitride semiconductor layer having a quantum well structure are crystal-grown on an auxiliary substrate, a bonding step in which a fiber optic plate substrate having transparency to fluorescence and the light-emitting layer on the auxiliary substrate are directly bonded to each other to form a bonded body, and a removing step in which the auxiliary substrate and the buffer layer are removed from the bonded body.

According to the method for manufacturing a light-emitting element, it is possible to easily obtain the light-emitting element in which the fiber optic plate substrate and the light-emitting layer are directly bonded to each other. In the obtained light-emitting element, unlike a conventional structure in which a light-emitting layer is provided on a sapphire substrate with a buffer layer interposed therebetween, some of light beams incident on the light-emitting element can be prevented from diffusing with the sapphire substrate and the buffer layer as a waveguide. Therefore, it is possible to reduce crosstalk. By using the fiber optic plate substrate instead of the sapphire substrate, it is possible to improve the efficiency of collecting the fluorescence generated in the light-emitting layer. In addition, since it is possible to avoid that lens coupling is essential in constructing the optical detection module, it is possible to expand the range of applications.

The light-emitting layer may have a laminated structure in which a GaN layer and an InGaN layer are alternately laminated, and the buffer layer may be a GaN layer. Therefore, the light-emitting layer can be appropriately crystal-grown on the auxiliary substrate. In the obtained light-emitting element, fluorescence can be efficiently generated in the light-emitting layer. In addition, since the laminated structure is directly bonded to the fiber optic plate substrate, the generated fluorescence can be efficiently extracted to the fiber optic plate substrate side.

A metal layer forming step in which a metal layer is formed on a surface of the light-emitting layer on a side opposite to a bonding surface between the fiber optic plate substrate and the light-emitting layer may be included after the removing step. Therefore, in the obtained light-emitting element, it is possible to prevent charging when electrons or the like are incident on the light-emitting layer. In addition, by the reflection of light on the metal layer, the generated fluorescence can be efficiently extracted to the fiber optic plate substrate side.

An intermediate layer forming step in which an intermediate layer whose refractive index for the fluorescence is a refractive index between the fiber optic plate substrate and the light-emitting layer is formed on at least one of the fiber optic plate substrate and the light-emitting layer may be included between the light-emitting layer forming step and the bonding step. In this case, by adjusting the refractive index of the intermediate layer, the intermediate layer can function as a functional layer, such as an antireflection film, at the bonding surface between the fiber optic plate substrate and the light-emitting layer.

The intermediate layer may be a SiN layer, a $Ta_3O_5$ layer, a $HfO_2$ layer, or a combination thereof. Therefore, the intermediate layer can function as an antireflection film. In addition, it becomes easy to design a multilayer film containing other high refractive index materials.

A scanning electron microscope according to one aspect of the present disclosure includes an electron beam source that emits a primary electron beam toward a sample, the above-described light-emitting element that generates fluorescence in response to incidence of a secondary electron beam generated in the sample by emission of the primary electron beam, and a detection optical system that detects the fluorescence generated by the light-emitting element.

In the light-emitting element forming the scanning electron microscope, the fiber optic plate substrate and the light-emitting layer are directly bonded to each other. Therefore, unlike a conventional structure in which a light-emitting layer is provided on a sapphire substrate with a buffer layer interposed therebetween, some of light beams incident on the light-emitting element can be prevented from diffusing with the sapphire substrate and the buffer layer as a waveguide. As a result, it is possible to reduce crosstalk. By using the fiber optic plate substrate instead of the sapphire substrate, it is possible to improve the efficiency of collecting the fluorescence generated in the light-emitting layer.

Advantageous Effects of Invention

According to the present disclosure, it is possible to reduce crosstalk and expand the range of applications.

DESCRIPTION OF EMBODIMENTS

Hereinafter, preferred embodiments of a light-emitting element, an optical detection module, a method for manufacturing a light-emitting element, and a scanning electron microscope according to one aspect of the present disclosure will be described in detail with reference to the diagrams.
[Configuration Example of Light-Emitting Element]

Figure 1:
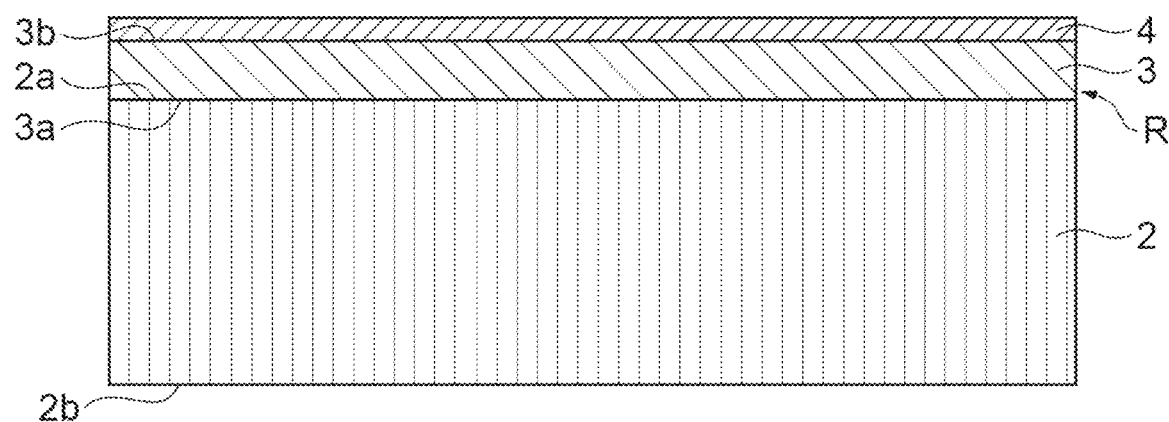
FIG. 1 is a schematic cross-sectional view showing an embodiment of a light-emitting element.

FIG. 1 is a schematic cross-sectional view showing an embodiment of a light-emitting element. A light-emitting element 1 is an element that generates fluorescence in response to the incidence of electrons or the like. As shown in FIG. 1, the light-emitting element 1 includes a fiber optic plate substrate 2, a light-emitting layer 3, and a metal layer 4.

The fiber optic plate substrate 2 is a substrate having a function of transmitting light incident from an incidence surface 2*a* to an exit surface 2*b*. The fiber optic plate substrate 2 has transparency to light (fluorescence) generated in the light-emitting layer 3. The fiber optic plate substrate 2 includes, for example, a plurality of core glasses, a clad glass covering the core glasses, and a light absorber glass arranged between the plurality of core glasses. The core glass is integrated with the clad glass. The core glass has a fibrous shape, and extends from the incidence surface 2*a* of the fiber optic plate substrate 2 to the exit surface 2*b*. The diameter of the core glass is, for example, approximately 0.001 to 0.05 mm. The cross-sectional shape of the core glass is circular, for example.

The core glass can contain a network-forming oxide that forms a network of glass, a network-modifying oxide that melts with the network-forming oxide to affect the properties of the glass, and an intermediate oxide having properties intermediate between the network-forming oxide and the network-modifying oxide. Examples of the network-forming oxide include $B_2O_3$, $SiO_2$, and $ZrO_2$. Examples of the network-modifying oxide include $WO_3$, $Gd_2O_3$, $La_2O_3$, and $Nb_2O_5$. Examples of the intermediate oxide include $TiO_2$, $ZrO_2$, and $ZnO$.

The clad glass is arranged so as to bury the core glass, and covers each outer peripheral portion of the core glass. The clad glass extends from the incidence surface 2*a* of the fiber optic plate substrate 2 to the exit surface 2*b*. Similarly to the core glass, the clad glass can contain a network-forming oxide that forms a network of glass, a network-modifying oxide that melts with the network-forming oxide to affect the properties of the glass, and an intermediate oxide having properties intermediate between the network-forming oxide and the network-modifying oxide. The refractive index of the clad glass is smaller than that of the core glass.

The light absorber glass has a fibrous shape thinner than the core glass, and extends from the incidence surface 2*a* of the fiber optic plate substrate 2 to the exit surface 2*b*. The light absorber glass has a property of absorbing light (stray light) leaking from the core glass and the clad glass. The light absorber glass may be formed of a glass composition. The glass composition may contain $SiO_2$ as a main component and contain $Fe_2O_3$ and the like.

The light-emitting layer 3 is a layer formed of a nitride semiconductor layer having a quantum well structure. The light-emitting layer 3 has one surface 3*a* facing the fiber optic plate substrate 2 side and the other surface 3*b* located on the opposite side of the one surface 3*a*. The quantum well structure herein includes not only a general quantum well structure but also a quantum wire structure and a quantum dot structure. In addition, the nitride semiconductor is a compound containing at least one of Ga, In, and Al as a group III element and containing N as a main group V element.

Figure 2:
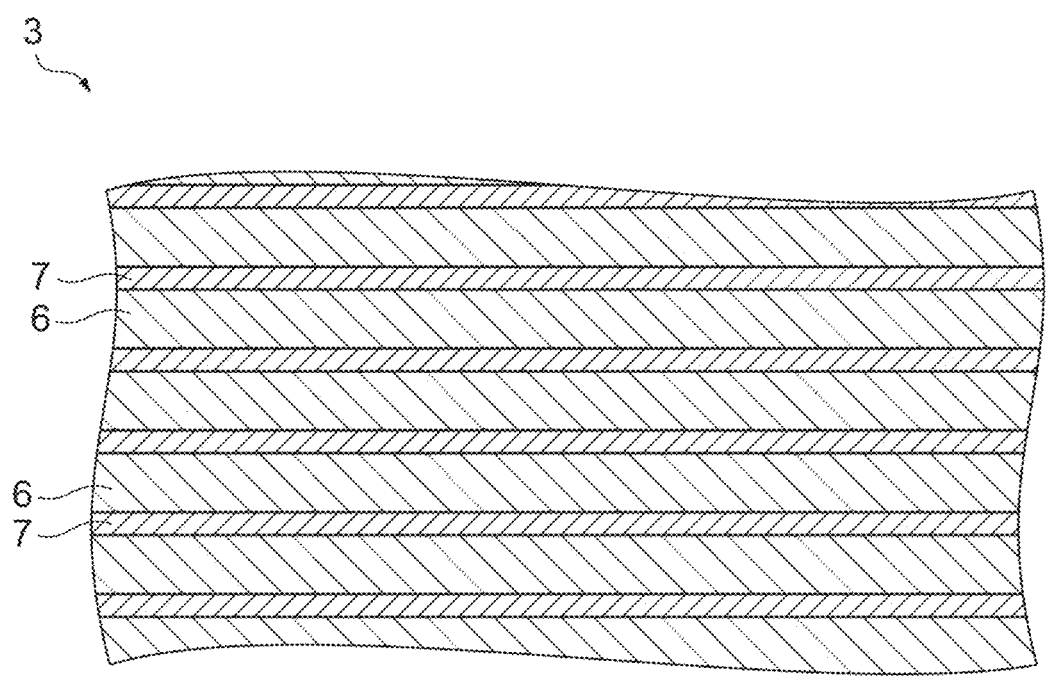
FIG. 2 is a schematic cross-sectional view showing the structure of a light-emitting layer.

In the present embodiment, the light-emitting layer 3 has a laminated structure in which a GaN layer 6 and an InGaN layer 7 are alternately laminated, as shown in FIG. 2. The light-emitting layer 3 does not have an $In_xGa_{1-x}N$ ($0 \le x \le 1$) layer or a GaN layer as a buffer layer, and the GaN layer 6 forming the outermost layer of the quantum well structure forms one surface 3*a* and the other surface 3*b*. When electrons or the like are incident on the light-emitting layer 3, pairs of electrons and holes are formed in the quantum well structure, and fluorescence is generated in the process of recombination of the pairs of electrons and holes in the quantum well structure. At least a part of the fluorescence generated in the light-emitting layer 3 is incident on the incidence surface 2*a* of the fiber optic plate substrate 2, guided to the core glass, and emitted from the exit surface 2*b*.

The metal layer 4 is a layer having a function of preventing charging when electrons or the like are incident on the light-emitting layer 3. In addition, the metal layer 4 has a function of reflecting the fluorescence generated in the light-emitting layer 3 and efficiently transmitting the fluorescence to the fiber optic plate substrate 2 side. The metal layer 4 is provided on a surface opposite to a bonding surface R between the fiber optic plate substrate 2 and the light-emitting layer 3, that is, on the other surface 3*b* of the light-emitting layer 3. The metal layer 4 is provided over the entire other surface 3*b* of the light-emitting layer 3 with a thickness sufficiently smaller than the thickness of the light-emitting layer 3 by evaporation of a metal such as Al.

Figure 3:
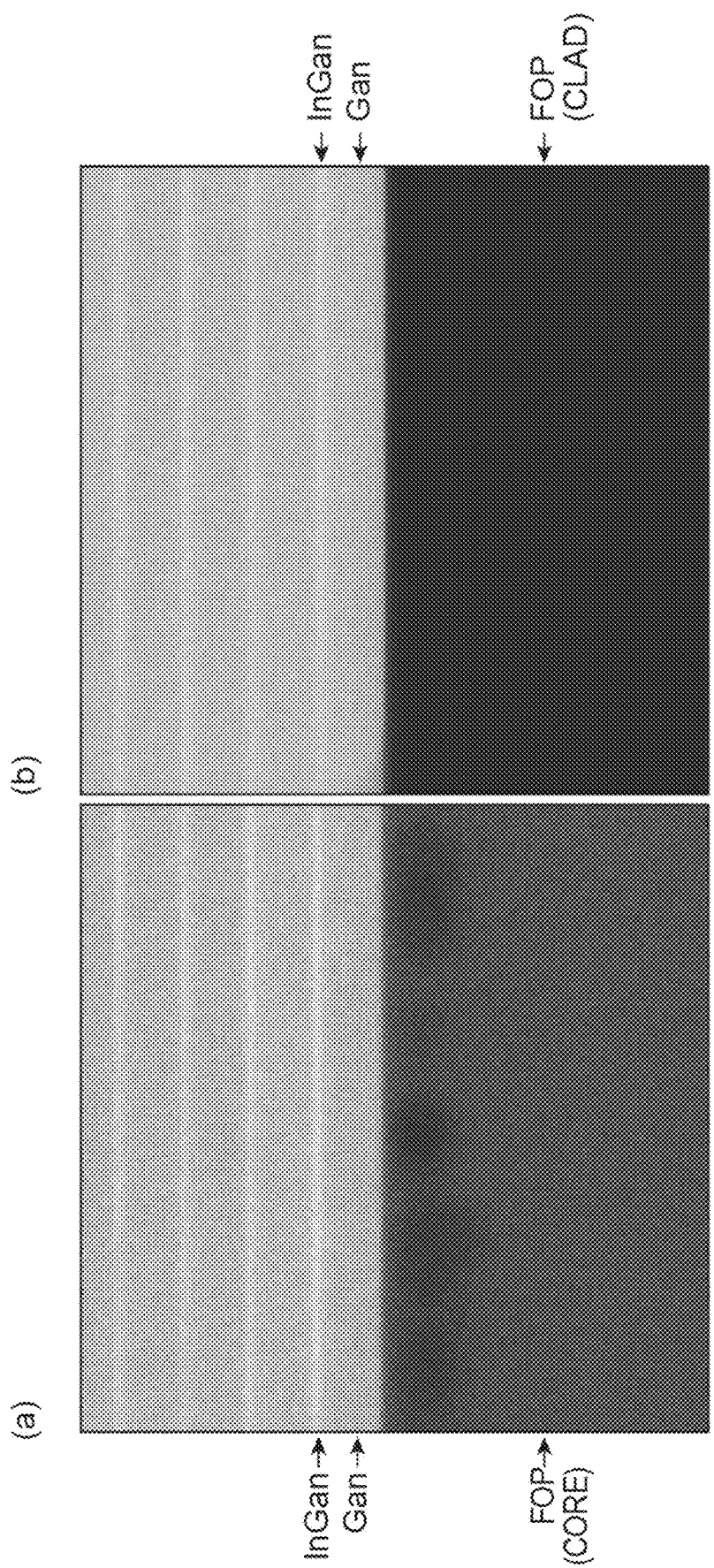
FIG. 3(a) is an enlarged photograph of the vicinity of a bonding surface between the core glass of a fiber optic plate substrate and a light-emitting layer.
FIG. 3(b) is an enlarged photograph of the vicinity of a bonding surface between the clad glass of the fiber optic plate substrate and the light-emitting layer.

In the light-emitting element 1, the fiber optic plate substrate 2 and the light-emitting layer 3 described above are directly bonded to each other to form the bonding surface R. In the present embodiment, the incidence surface 2*a* of the fiber optic plate substrate 2 and the one surface 3*a* of the light-emitting layer 3 are bonded to each other by thermocompression bonding or room temperature bonding without using an adhesive or the like. FIGS. 3(*a*) and 3(*b*) are enlarged photographs of the vicinity of the bonding surface between the fiber optic plate substrate and the light-emitting layer that are bonded to each other by thermocompression bonding. FIG. 3(a) shows the vicinity of the bonding surface between the core glass of the fiber optic plate substrate and the light-emitting layer analyzed by a scanning transmission electron microscope, and FIG. 3(b) shows the vicinity of the bonding surface between the clad glass of the fiber optic plate substrate and the light-emitting layer analyzed by a scanning transmission electron microscope. From the results shown in FIGS. 3(a) and 3(b), it can be confirmed that both the core glass and the clad glass of the fiber optic plate substrate are integrated with the light-emitting layer by thermocompression bonding and accordingly are strongly bonded without using an adhesive or the like.

Figure 4:
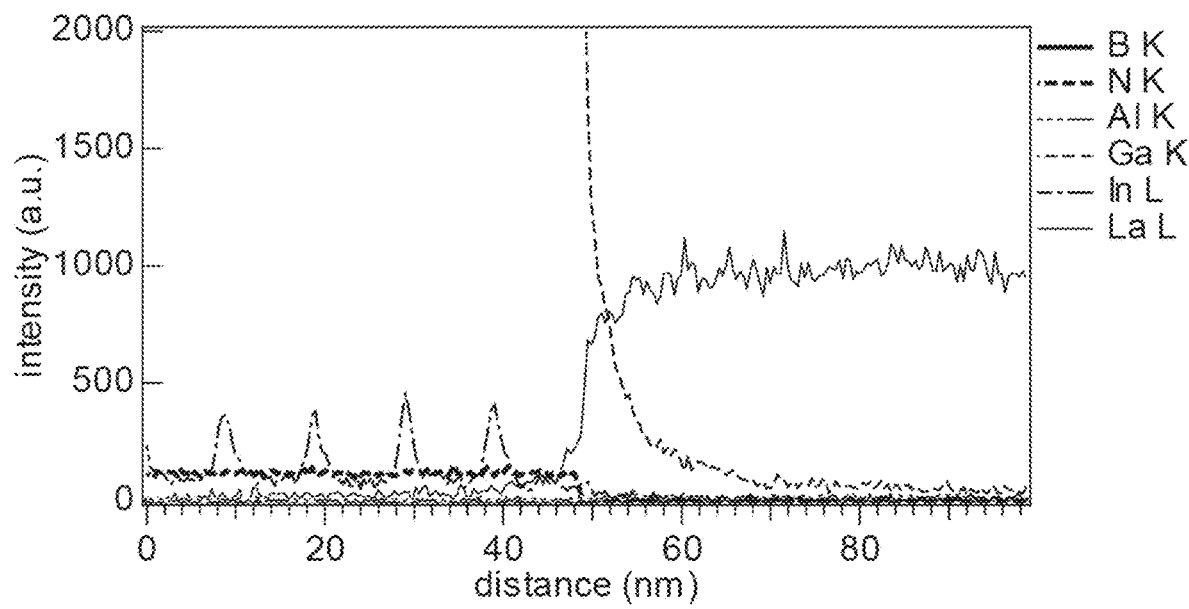
FIG. 4(a) is a component analysis result in the vicinity of a bonding surface between the core glass of a fiber optic plate substrate and a light-emitting layer.
FIG. 4(b) is a component analysis result in the vicinity of a bonding surface between the clad glass of the fiber optic plate substrate and the light-emitting layer.
Figure 4:
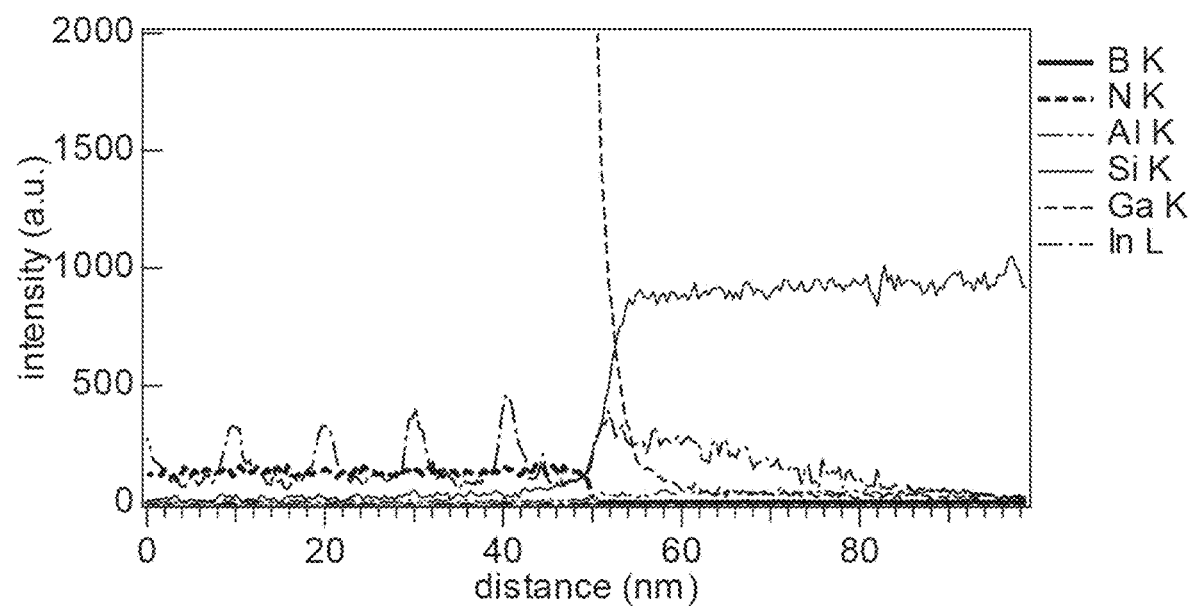

In the light-emitting element 1, since the incidence surface 2a of the fiber optic plate substrate 2 and the one surface 3a of the light-emitting layer 3 are thermocompression-bonded to each other, the constituent elements of the light-emitting layer 3 are diffused into the fiber optic plate substrate 2. The constituent elements of the fiber optic plate substrate 2 may be diffused into the light-emitting layer 3. FIG. 4(a) shows the result of component analysis in the vicinity of the bonding surface between the core glass of the fiber optic plate substrate and the light-emitting layer. In addition, FIG. 4(b) shows the result of component analysis in the vicinity of the bonding surface between the clad glass of the fiber optic plate substrate and the light-emitting layer. In these diagrams, the horizontal axis indicates distance and the vertical axis indicates intensity. The vicinity of the distance of 50 nm corresponds to the bonding surface between the core glass of the fiber optic plate substrate and the light-emitting layer, and the light-emitting layer is on the left side and the fiber optic plate substrate is on the right side. For sample processing, a focused ion beam method was used. An atomic resolution analysis electron microscope (product name: JLM-ARM200F DUAL-X) manufactured by JEOL Ltd. was used as a component analyzer, and the acceleration voltage was set to 200 kV.

From the result shown in FIG. 4(a), it can be seen that Ga contained in the light-emitting layer 3 is diffused into the core glass of the fiber optic plate substrate 2. In addition, it can be seen that La contained in the core glass of the fiber optic plate substrate 2 is diffused into the light-emitting layer 3. From the result shown in FIG. 4(b), it can be seen that In or Ga contained in the light-emitting layer 3 is diffused into the clad glass of the fiber optic plate substrate 2. In addition, it can be seen that Si contained in the clad glass of the fiber optic plate substrate 2 is diffused into the light-emitting layer 3. Due to the diffusion of the constituent elements of the light-emitting layer 3 into the fiber optic plate substrate 2 or the diffusion of the constituent elements of the fiber optic plate substrate 2 into the light-emitting layer 3, the bonding strength between the fiber optic plate substrate 2 and the light-emitting layer 3 is sufficiently increased.

[Manufacturing Example of Light-Emitting Element]

Figure 5:
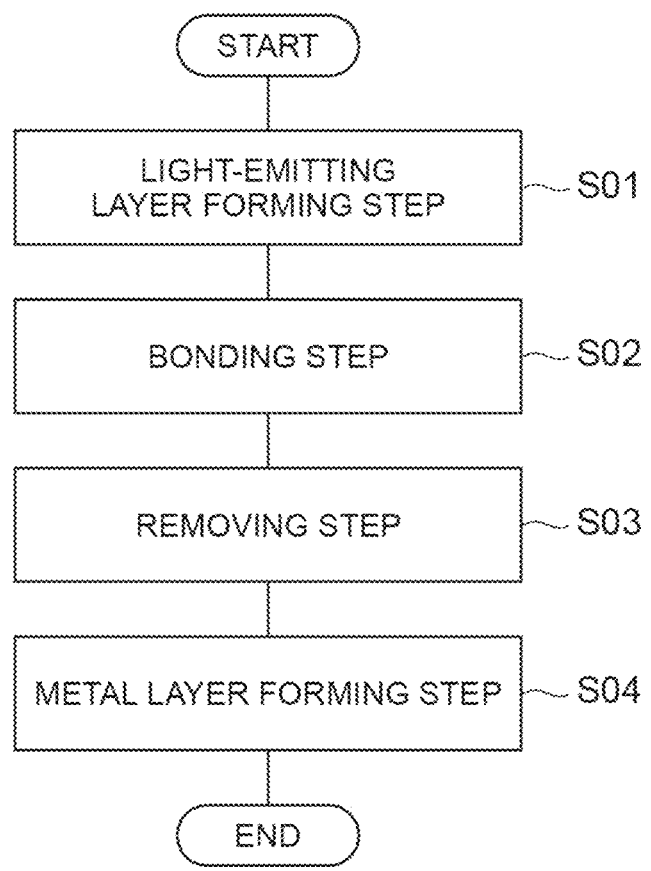
FIG. 5 is a flowchart showing an example of a light-emitting element manufacturing process.

FIG. 5 is a flowchart showing an example of a light-emitting element manufacturing process. As shown in the diagram, the manufacturing process of the light-emitting element 1 includes a light-emitting layer forming step (step S01), a bonding step (step S02), a removing step (step S03), and a metal layer forming step (step S04).

Figure 6:
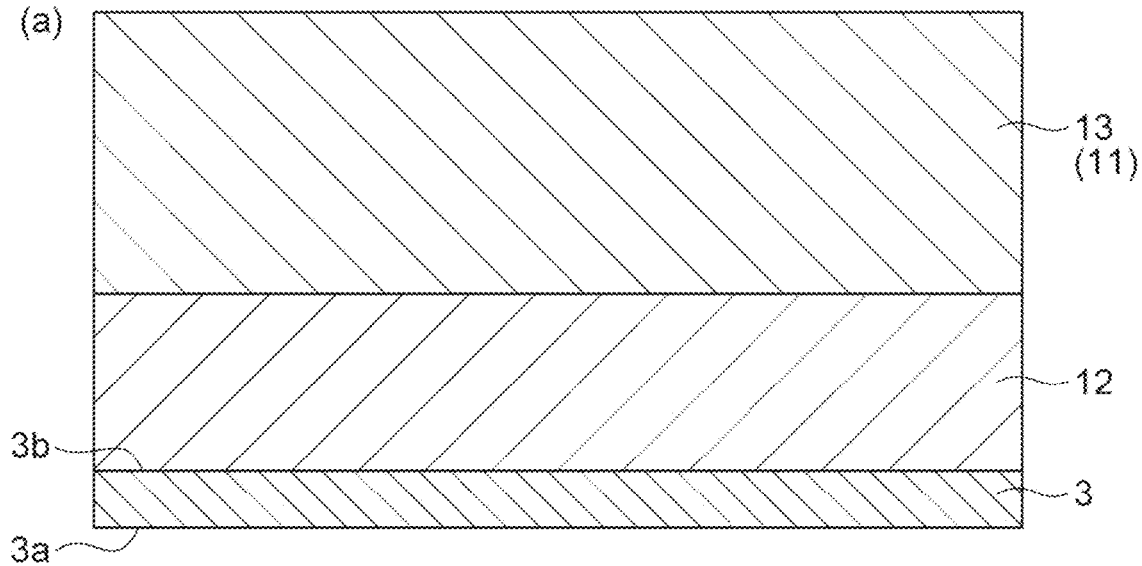
FIG. 6(*a*) is a schematic cross-sectional view showing a light-emitting layer forming step, and FIG. 6(*b*) is a schematic cross-sectional view showing a bonding step.
Figure 6:
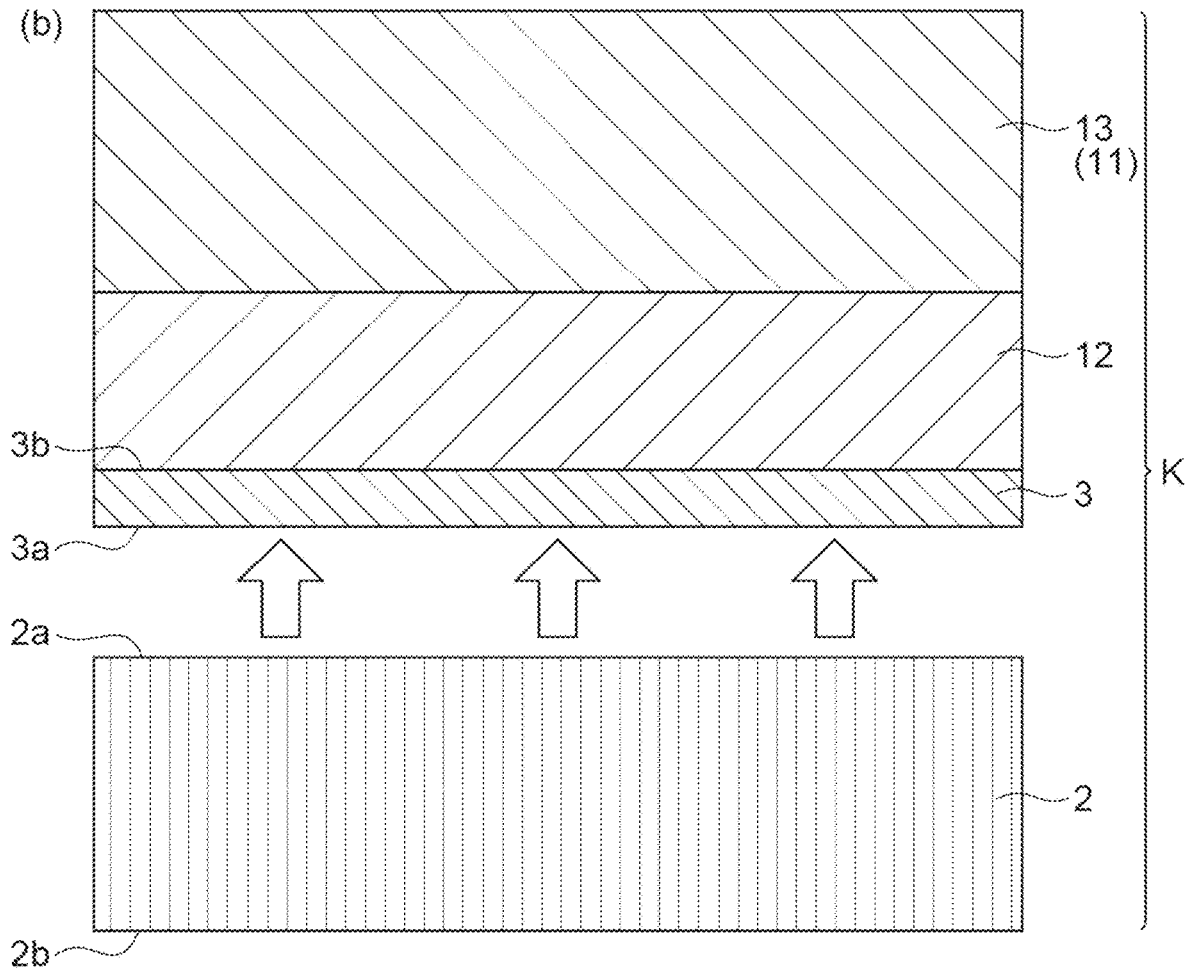

As shown in FIG. 6(a), the light-emitting layer forming step is a step of crystal-growing a buffer layer 12 and the light-emitting layer 3, which is a nitride semiconductor layer having a quantum well structure, on an auxiliary substrate 11. When forming the buffer layer 12 and the light-emitting layer 3, for example, a metal organic chemical vapor deposition (MOCVD) method can be used. Here, the auxiliary substrate 11 is a sapphire substrate 13. The sapphire substrate 13 is introduced into the growth chamber of the MOCVD apparatus and subjected to heat treatment in a hydrogen atmosphere to clean the surface. Then, the substrate temperature is increased to about 1075° C. to form the buffer layer 12 formed of GaN on the sapphire substrate 13. After forming the buffer layer 12, the substrate temperature is lowered to about 800° C., and the GaN layer 6 and the InGaN layer 7 are alternately grown to obtain the light-emitting layer 3.

The bonding step is a step of directly bonding the fiber optic plate substrate 2 and the light-emitting layer 3 on the auxiliary substrate 11 to form a bonded body K. Here, as shown in FIG. 6(b), one surface 3a of the light-emitting layer 3 on the auxiliary substrate 11 is made to face the incidence surface 2a of the fiber optic plate substrate 2, and the one surface 3a of the light-emitting layer 3 and the incidence surface 2a of the fiber optic plate substrate 2 are thermocompression-bonded to each other. The conditions for thermocompression bonding are, for example, a temperature of 100° C. to 800° C. and a pressure of 2 kg/cm 2 to 40 kg/cm 2. In the obtained bonded body K, the constituent elements of the light-emitting layer 3 are diffused into the fiber optic plate substrate 2 and the constituent elements of the fiber optic plate substrate 2 are diffused into the light-emitting layer 3, so that a strong bond between the fiber optic plate substrate 2 and the light-emitting layer 3 is realized.

Figure 7:
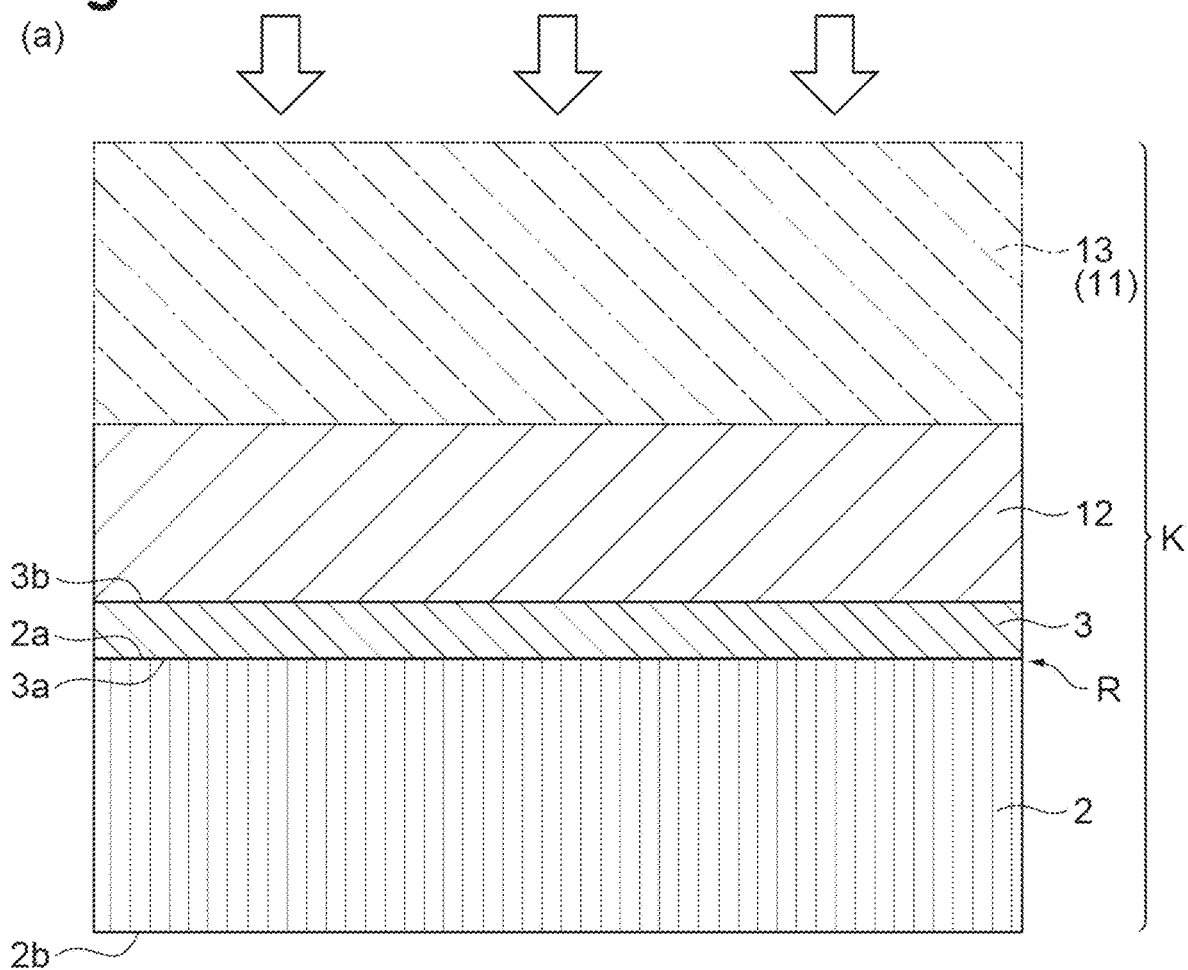
FIGS. 7(*a*) and 7(*b*) are schematic cross-sectional views showing a removing step.
Figure 7:
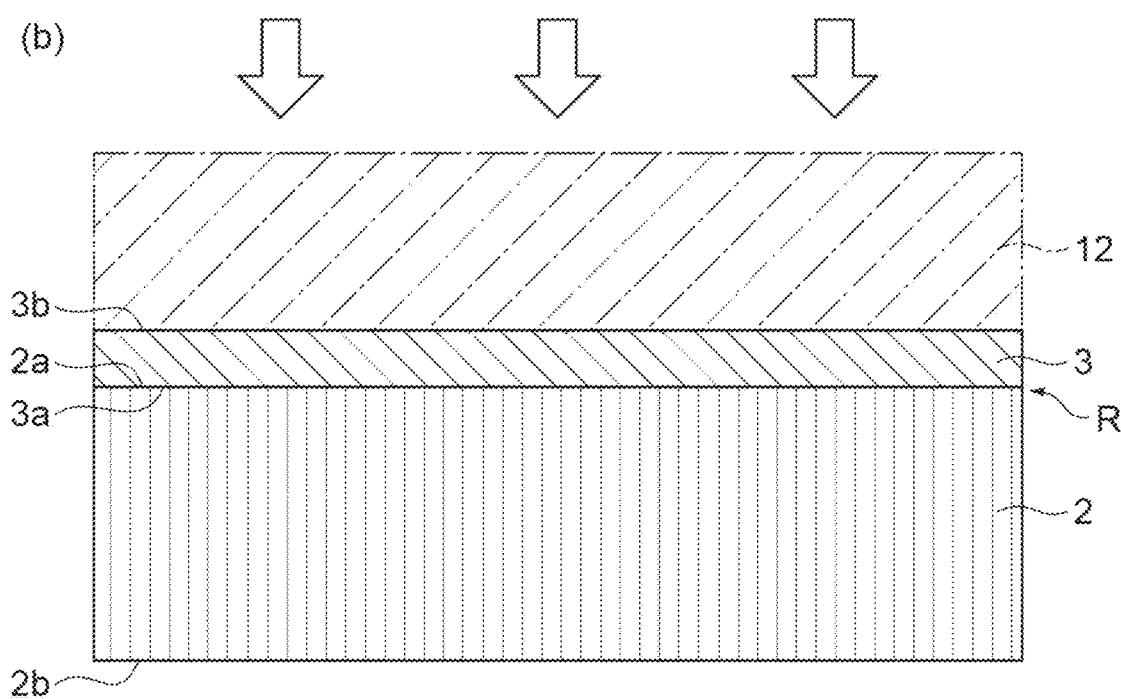

The removing step is a step of removing the auxiliary substrate 11 and the buffer layer 12 from the bonded body K. When removing the sapphire substrate 13 that is the auxiliary substrate 11, for example, laser lift-off can be applied. In this case, as shown in FIG. 7(a), for example, high-density pulsed UV laser light is emitted to the sapphire substrate 13 and reaches the buffer layer 12 formed of GaN. Then, GaN is decomposed into Ga and N near the interface of the buffer layer 12, so that the sapphire substrate 13 can be peeled off from the buffer layer 12.

After peeling off the sapphire substrate 13, the buffer layer 12 is removed by etching as shown in FIG. 7(b). Since the buffer layer 12 formed of GaN is chemically stable, it is preferable to use dry etching from the viewpoint of securing the etching rate. Examples of the dry etching method include reactive ion etching (RIE), reactive ion beam etching (RIBE), chemically assisted ion beam etching (CAIBE), and electron cyclotron resonance etching (ECRE). In addition, the removal of the sapphire substrate 13 may be performed by etching in the same manner as the removal of the buffer layer 12. Sapphire and GaN are chemically stable and extremely hard substances, but these can also be processed by grinding and polishing. Therefore, as a method for removing the sapphire substrate 13 and the buffer layer 12 formed of GaN, processing by grinding and polishing may be adopted.

Figure 8:
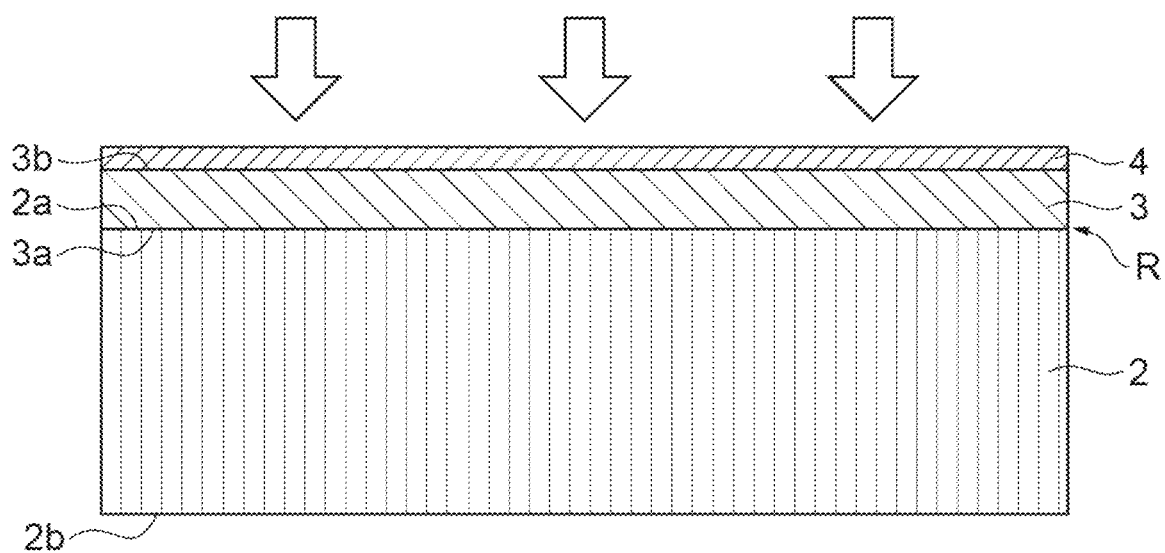
FIG. 8 is a schematic cross-sectional view showing a metal layer forming step.

The metal layer forming step is a step of forming the metal layer 4 on the other surface 3b of the light-emitting layer 3. Here, as shown in FIG. 8, Al is evaporated on the other surface 3b of the light-emitting layer 3 to form the metal layer 4. As a result, the light-emitting element 1 shown in FIG. 1 is obtained.

[Function and Effect]

As described above, in the light-emitting element 1, the fiber optic plate substrate 2 and the light-emitting layer 3 are directly bonded to each other. In the light-emitting element 1, unlike the conventional structure in which the light-emitting layer 3 is provided on the sapphire substrate 13 with a buffer layer interposed therebetween, some of the light beams incident on the light-emitting element 1 can be prevented from diffusing with the sapphire substrate and the buffer layer as a waveguide. Therefore, it is possible to reduce crosstalk. By using the fiber optic plate substrate 2 instead of the sapphire substrate, it is possible to improve the efficiency of collecting the fluorescence generated in the light-emitting layer 3. In addition, since it is possible to avoid that lens coupling is essential in constructing the optical detection module, it is possible to expand the range of applications.

In the light-emitting element 1, the fiber optic plate substrate 2 and the light-emitting layer 3 are bonded to each other by thermocompression bonding. Therefore, the fiber optic plate substrate 2 and the light-emitting layer 3 can be appropriately directly bonded to each other without using an adhesive. In addition, in the light-emitting element 1, the constituent elements of the light-emitting layer 3 are diffused into the fiber optic plate substrate 2, and the constituent elements of the fiber optic plate substrate 2 are diffused into the light-emitting layer 3. Such diffusion of the constituent elements can sufficiently increase the bonding strength between the fiber optic plate substrate 2 and the light-emitting layer 3.

In the light-emitting element 1, the light-emitting layer 3 has a laminated structure in which the GaN layer 6 and the InGaN layer 7 are alternately laminated. Due to such a laminated structure, fluorescence can be efficiently generated in the light-emitting layer 3. In addition, since the laminated structure is directly bonded to the fiber optic plate substrate 2, the generated fluorescence can be efficiently extracted to the fiber optic plate substrate 2 side. In the light-emitting element 1, the metal layer 4 is provided on the other surface 3b of the light-emitting layer 3. Due to the metal layer 4, it is possible to prevent charging when electrons or the like are incident on the light-emitting layer 3. In addition, by the reflection of light on the metal layer 4, the generated fluorescence can be efficiently extracted to the fiber optic plate substrate 2 side.

Figure 9:
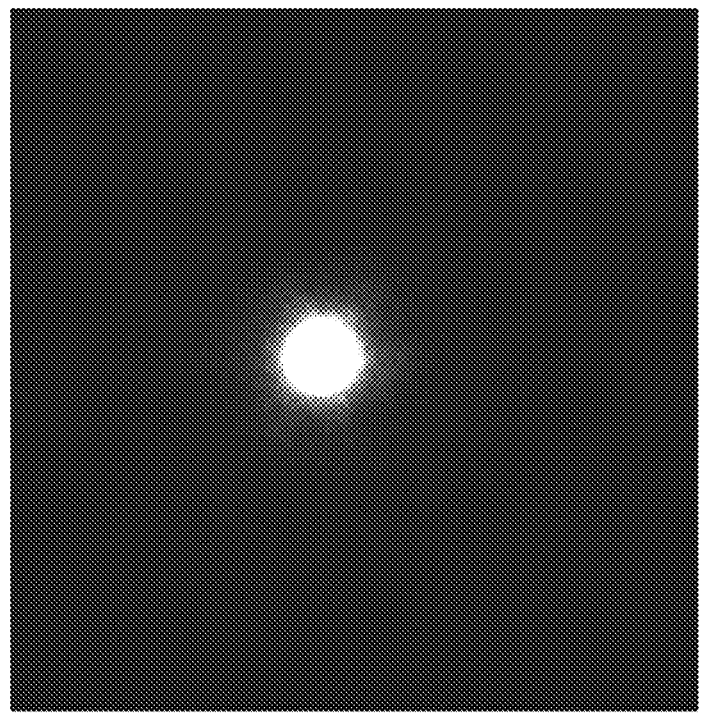
FIG. 9(*a*) is a diagram showing the shape of a fluorescent spot in Comparative Example, and FIG. 9(*b*) is a diagram showing the shape of a fluorescent spot in Example.
Figure 9:
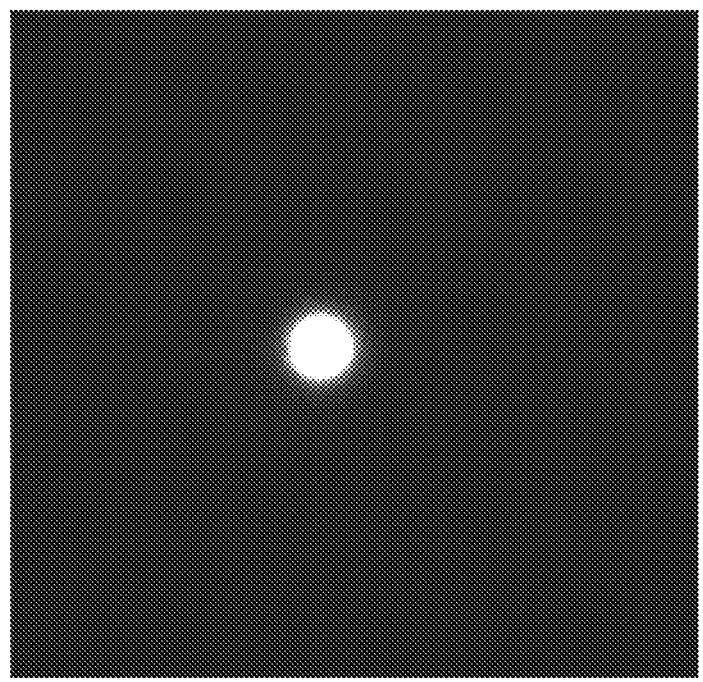
Figure 10:
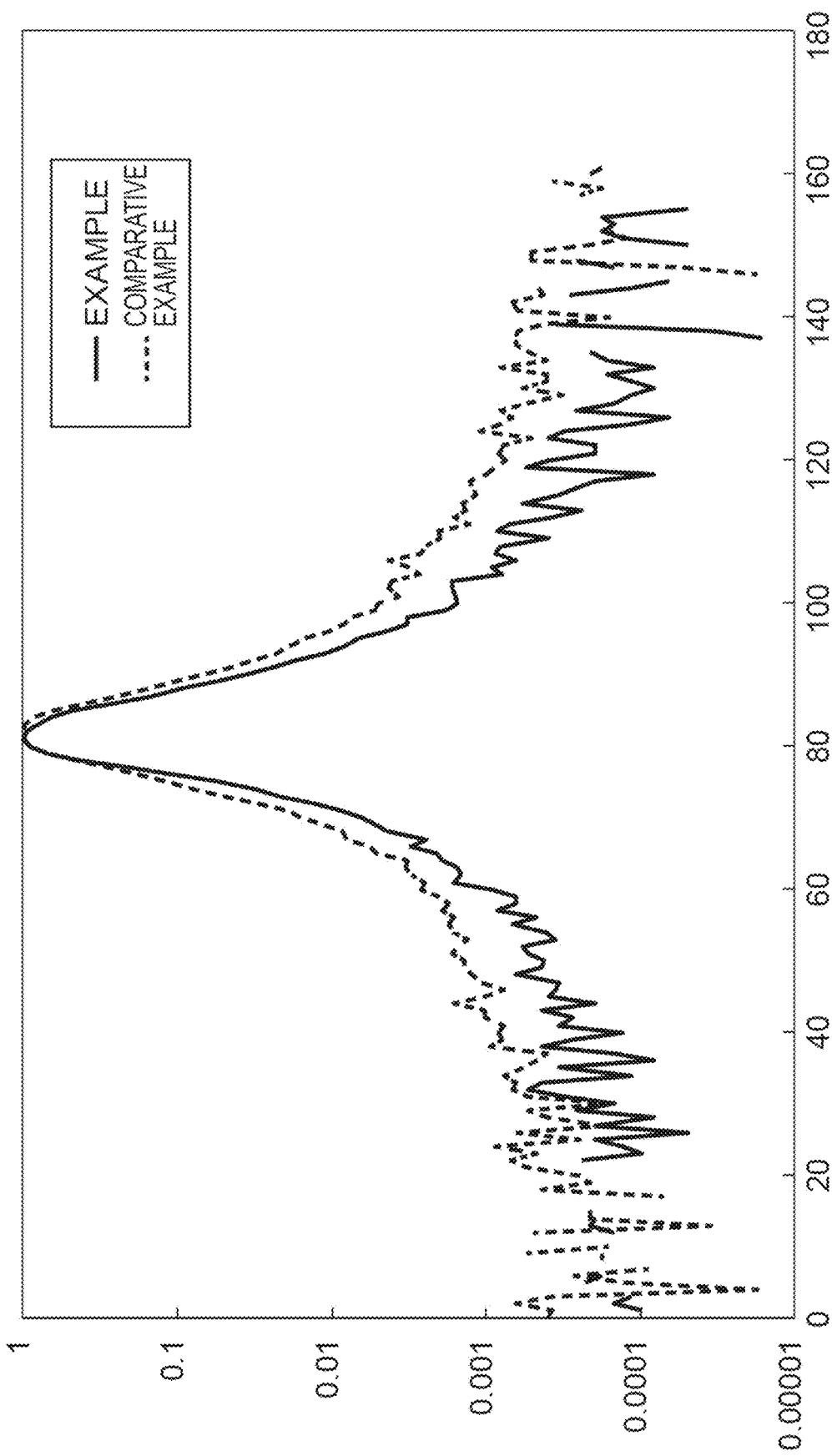
FIG. 10 is a diagram showing the brightness distribution of fluorescence in Example and Comparative Example.

FIG. 9 (a) is a diagram showing the shape of a fluorescent spot in Comparative Example, and FIG. 9 (b) is a diagram showing the shape of a fluorescent spot in Example. In addition, FIG. 10 is a diagram showing the brightness distribution of fluorescence in Example and Comparative Example. In Example, a sample was used in which a fiber optic plate substrate and a light-emitting layer were directly bonded to each other in the same manner as the light-emitting element 1 shown in FIG. 1. In Comparative Example, a sample was used in which a light-emitting layer was provided on a sapphire substrate with an InGaN buffer layer and a GaN layer interposed therebetween.

In the sample according to Comparative Example, as shown in FIGS. 9(a) and 10, the full width at half maximum of the fluorescence transmitted through the sapphire substrate and extracted to the outside was about 50 μm. On the other hand, in the sample according to Example, as shown in FIGS. 9(b) and 10, the full width at half maximum of the fluorescence extracted from the fiber optic plate substrate to the outside was about 42 μm. Therefore, it was confirmed that, in Example, the diffusion of the fluorescence generated in the light-emitting layer was reduced to obtain the effect of suppressing crosstalk.

[Application Examples of Light-Emitting Element]

In the light-emitting element 1 described above, for example, by arranging a photodetector 22 on the fiber optic plate substrate 2 side, it is possible to construct various optical detection modules 21. The photodetector 22 is formed by a solid state detection element or an electron tube device. Examples of the solid state detection element include an image sensor such as a CCD or a CMOS, a photodiode array, an avalanche photodiode array, an avalanche photodiode array operating in Geiger mode, and an image intensifier. Examples of the electron tube device include a photomultiplier tube and a streak tube.

From the viewpoint of making full use of the performance of the light-emitting element 1, the photodetector 22 may be a multi-channel detector capable of simultaneously detecting the positions of a large number of light beams, and may be a detector having a time resolving performance. Examples of a detector capable of performing both position detection and time resolution include a multi-anode photomultiplier tube, a streak camera, a gated ICCD camera, and a gated ICMOS camera.

Figure 11:
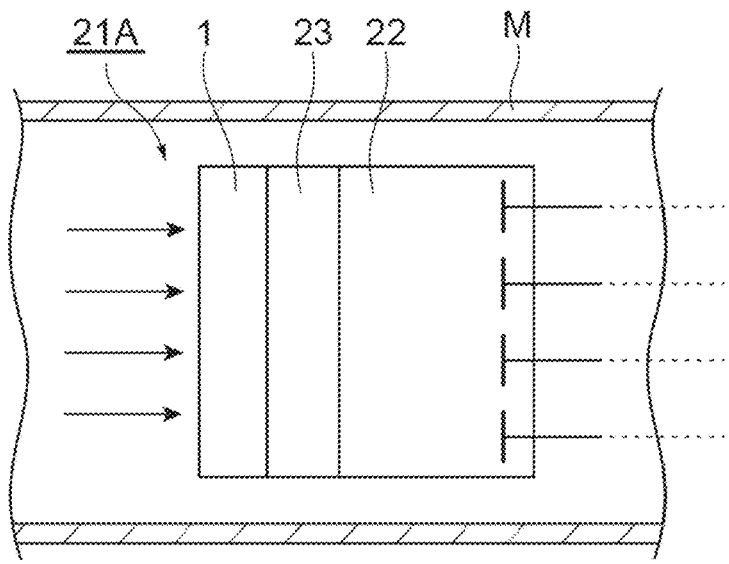
FIGS. 11(*a*) to 11(*c*) are schematic diagrams showing configuration examples of an optical detection module using a light-emitting element.
Figure 11:
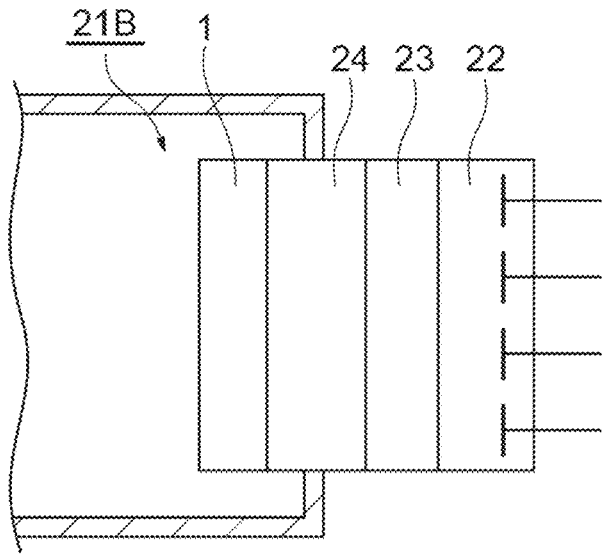
Figure 11:
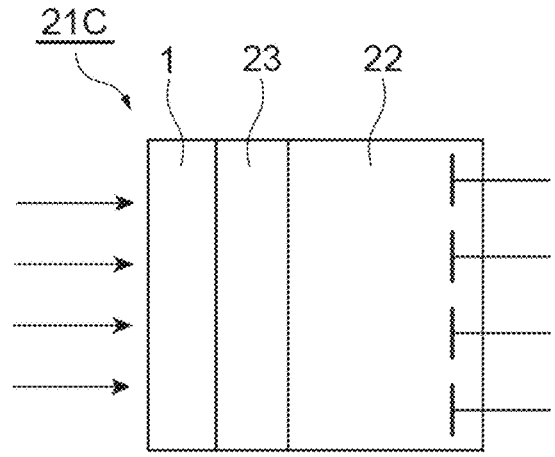

In an optical detection module 21A shown in FIG. 11(a), the photodetector 22 is arranged on the rear stage side of the light-emitting element 1. The photodetector 22 includes a fiber optic plate 23 as an input window. The optical detection module 21A is arranged inside a vacuum container M, such as a vacuum chamber or a vacuum tube. The optical detection module 21A can be applied to a detection optical system of a scanning electron microscope, for example. In the vacuum container M, a microchannel plate (not shown) may be arranged on the front stage side of the light-emitting element 1. In this case, the charged particles can be converted into electrons and multiplied by the microchannel plate, so that images and time characteristics of the fine charged particles can be obtained.

In an optical detection module 21B shown in FIG. 11(b), the photodetector 22 is arranged on the rear stage side of the light-emitting element 1. The photodetector 22 includes a fiber optic plate 23 as an input window. In the optical detection module 21B, the light-emitting element 1 is arranged inside the vacuum container M, such as a vacuum chamber or a vacuum tube, and the photodetector 22 is arranged outside the vacuum container M. A fiber optic plate 24 is further arranged between the light-emitting element 1 and the photodetector 22. The fiber optic plate 24 is optically coupled to the light-emitting element 1 and the fiber optic plate 23 of the photodetector 22, and is configured as a window material of the vacuum container M so as to keep the vacuum container M airtight. The optical detection module 21B can be applied in place of a conventional imaging apparatus in a time-of-flight mass spectrometry (TOF-MS) apparatus, for example. As in the case of FIG. 11(a), a microchannel plate (not shown) may be arranged on the front stage side of the light-emitting element 1 in the vacuum container M.

In an optical detection module 21C shown in FIG. 11(c), the photodetector 22 is arranged on the rear stage side of the light-emitting element 1. The photodetector 22 includes a fiber optic plate 23 as an input window. The optical detection module 21C is arranged, for example, in the atmosphere. The optical detection module 21C can be applied to an X-ray streak camera, for example, by using the photodetector 22 as a streak tube and combining an X-ray source, a pinhole lens, and the like on the front stage side of the light-emitting element 1. Since the light-emitting element 1 can also emit light for other radiation, time-resolved radiation observation can be performed.

Figure 12:
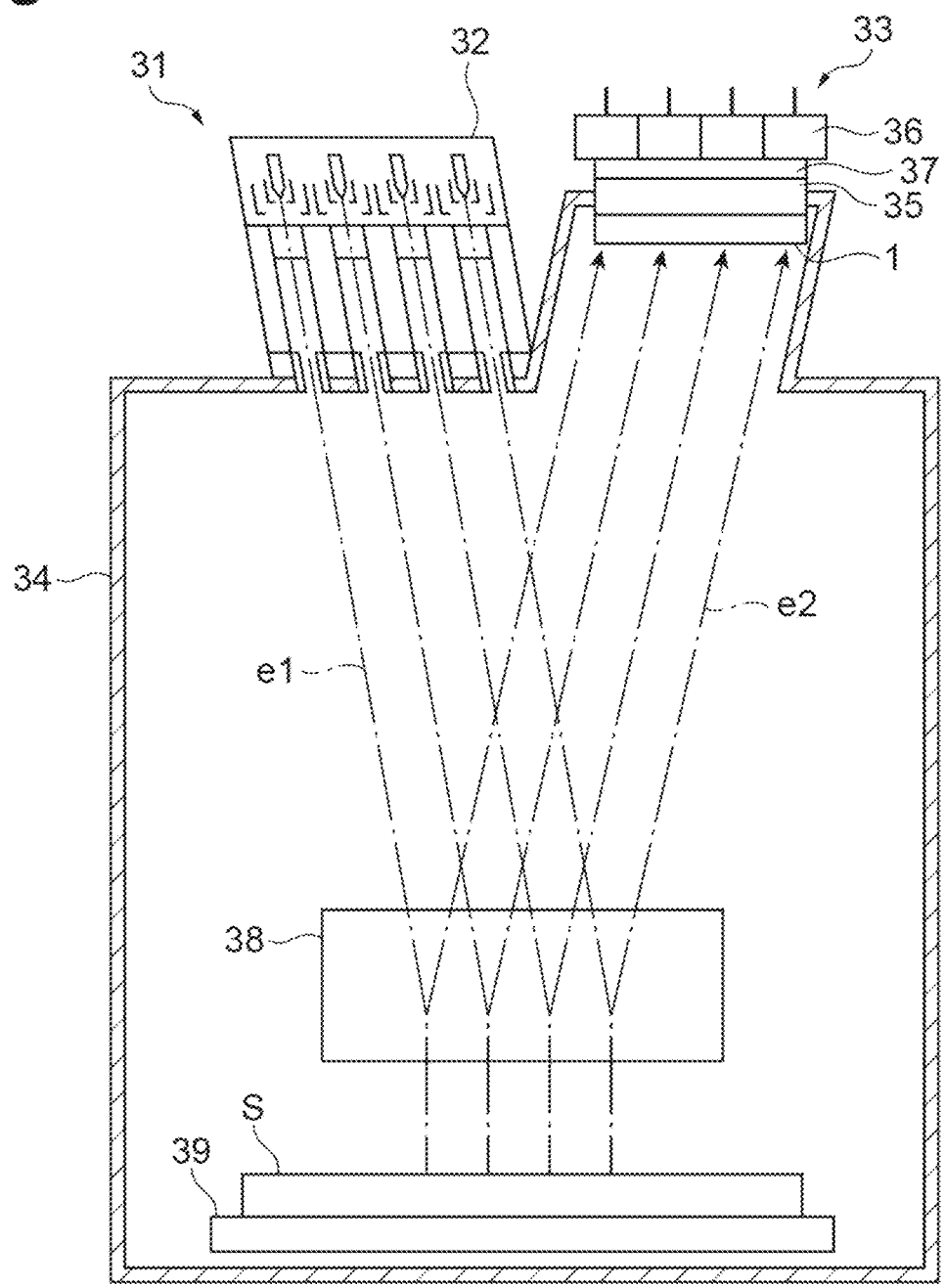
FIG. 12 is a schematic diagram showing a configuration example of a scanning electron microscope.

FIG. 12 is a schematic diagram showing a configuration example of a scanning electron microscope. A scanning electron microscope 31 shown in the diagram is a multi-beam scanning electron microscope, and includes an electron beam source 32 capable of emitting a plurality of primary electron beams e1, the light-emitting element 1 described above, and a detection optical system 33. The electron beam source 32, a sample S, and the light-emitting element 1 are arranged inside a vacuum chamber 34. The detection optical system 33 is formed by a fiber optic plate 35 serving as a window material of the vacuum chamber 34 to keep the vacuum chamber 34 airtight and a photodetector 36. The photodetector 36 is a multi-channel detector having a fiber optic plate 37 as an input window, and is arranged in the atmosphere.

The electron beam source 32 emits a plurality of primary electron beams e1 toward the sample S. The plurality of primary electron beams e1 are emitted to the sample S in a state in which the trajectories of the plurality of primary electron beams e1 are changed from the emission axis through a beam splitter 38. The sample S is placed on a stage 39 that can move in a plane direction perpendicular to the incidence axis of the plurality of primary electron beams e1. When the plurality of primary electron beams e1 emitted from the electron beam source 32 are emitted to the sample S, a plurality of secondary electron beams e2 are emitted from the surface of the sample S. The plurality of secondary electron beams e2 emitted from the surface of the sample S change their trajectories to the side opposite to the emission axis of the plurality of primary electron beams e1 through the beam splitter 38, and are incident on the light-emitting element 1. The light-emitting element 1 generates fluorescence corresponding to the incident secondary electron beams e2. The fluorescence generated by the light-emitting element 1 is guided to the fiber optic plate 37 and is guided into the atmosphere, and is incident on the photodetector 36. The photodetector 36 outputs a detection signal corresponding to the received fluorescence. By synchronizing the position of the primary electron beam e1 on the surface of the sample S with the detection signal from the photodetector 36, an image of the sample S can be obtained.

Modification Examples

The present disclosure is not limited to the embodiment described above. In the embodiment described above, thermocompression bonding was exemplified as a means for realizing direct bonding between the fiber optic plate substrate 2 and the light-emitting layer 3. However, the fiber optic plate substrate 2 and the light-emitting layer 3 may be directly bonded to each other by room temperature bonding. In the room temperature bonding, the incidence surface 2a of the fiber optic plate substrate 2 and the one surface 3a of the light-emitting layer 3 are polished, and the polished surfaces are brought into contact with each other. Even in such room temperature bonding, the fiber optic plate substrate 2 and the light-emitting layer 3 can be appropriately directly bonded to each other without using an adhesive. In addition, in room temperature bonding, the occurrence of distortion in the fiber optic plate substrate 2 due to heat is also suppressed. In addition, when performing room temperature bonding, it is preferable to use a GaN substrate as the auxiliary substrate 11. By using the GaN substrate as the auxiliary substrate 11, it is possible to relatively suppress the warping of the substrate. As a result, it is possible to improve the yield of room temperature bonding.

Figure 13:
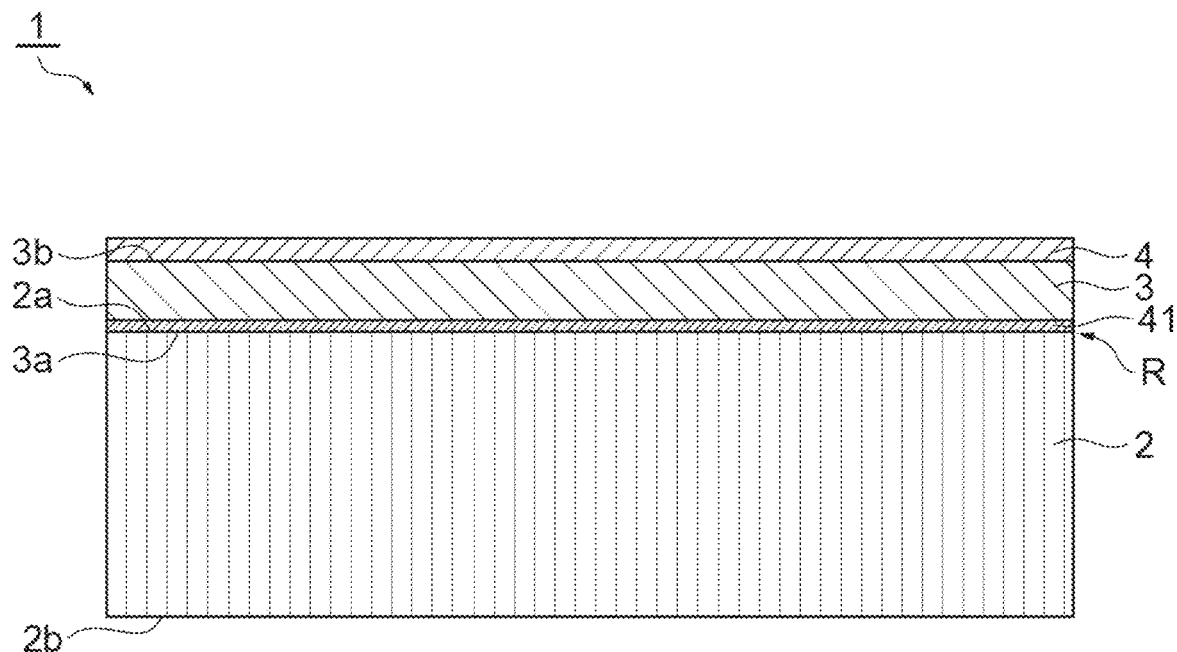
FIG. 13 is a schematic cross-sectional view showing Modification Example of the light-emitting element.

As shown in FIG. 13, on at least one of the fiber optic plate substrate 2 and the light-emitting layer 3 at the bonding surface R between the fiber optic plate substrate 2 and the light-emitting layer 3, an intermediate layer 41 whose refractive index for fluorescence is a refractive index between the fiber optic plate substrate 2 and the light-emitting layer 3 may be provided. The intermediate layer 41 is, for example, a SiN layer, a $Ta_3O_5$ layer, a $HfO_2$ layer, or a layer formed by a combination thereof. In this case, by adjusting the refractive index of the intermediate layer 41, the intermediate layer 41 can function as a functional layer, such as an antireflection film, at the bonding surface R between the fiber optic plate substrate 2 and the light-emitting layer 3. In addition, it becomes easy to design a multilayer film containing other high refractive index materials.

The intermediate layer 41 may be a component of the fiber optic plate substrate 2, may be a component of the light-emitting layer 3, or may be a component of both the fiber optic plate substrate 2 and the light-emitting layer 3. When the intermediate layer 41 is a component of the fiber optic plate substrate 2, the incidence surface 2a of the fiber optic plate substrate 2 is formed by the intermediate layer 41. When the intermediate layer 41 is a component of the light-emitting layer 3, one surface 3a of the fiber optic plate substrate 2 is formed by the intermediate layer 41. In the example of FIG. 13, the intermediate layer 41 is shown as a component of the light-emitting layer 3.

Figure 14:
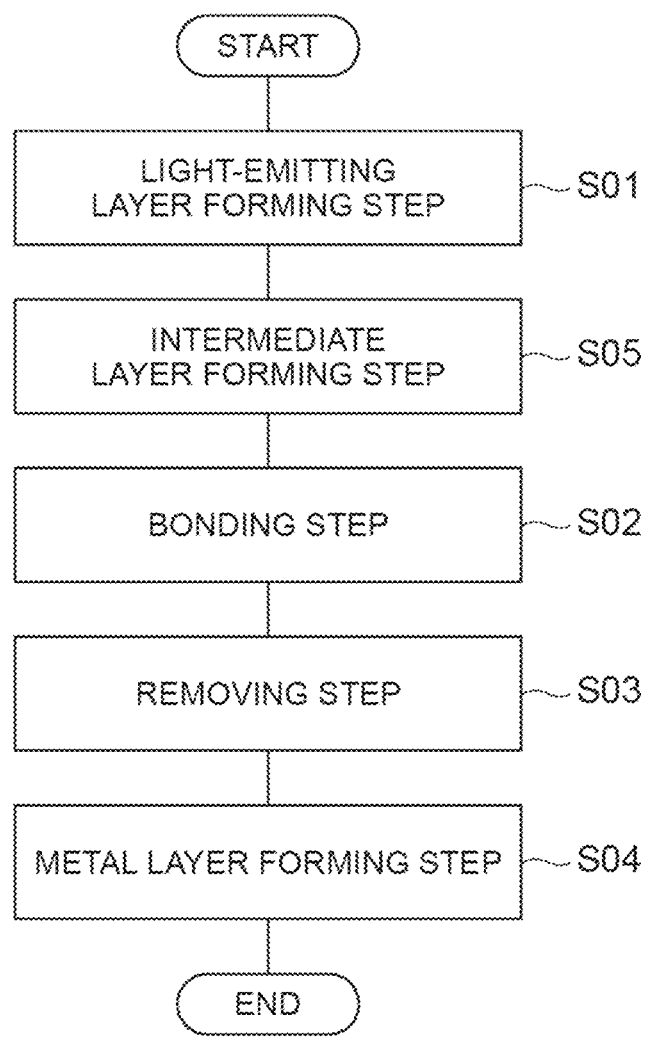
FIG. 14 is a flowchart showing an example of a process for manufacturing the light-emitting element according to Modification Example.
Figure 15:
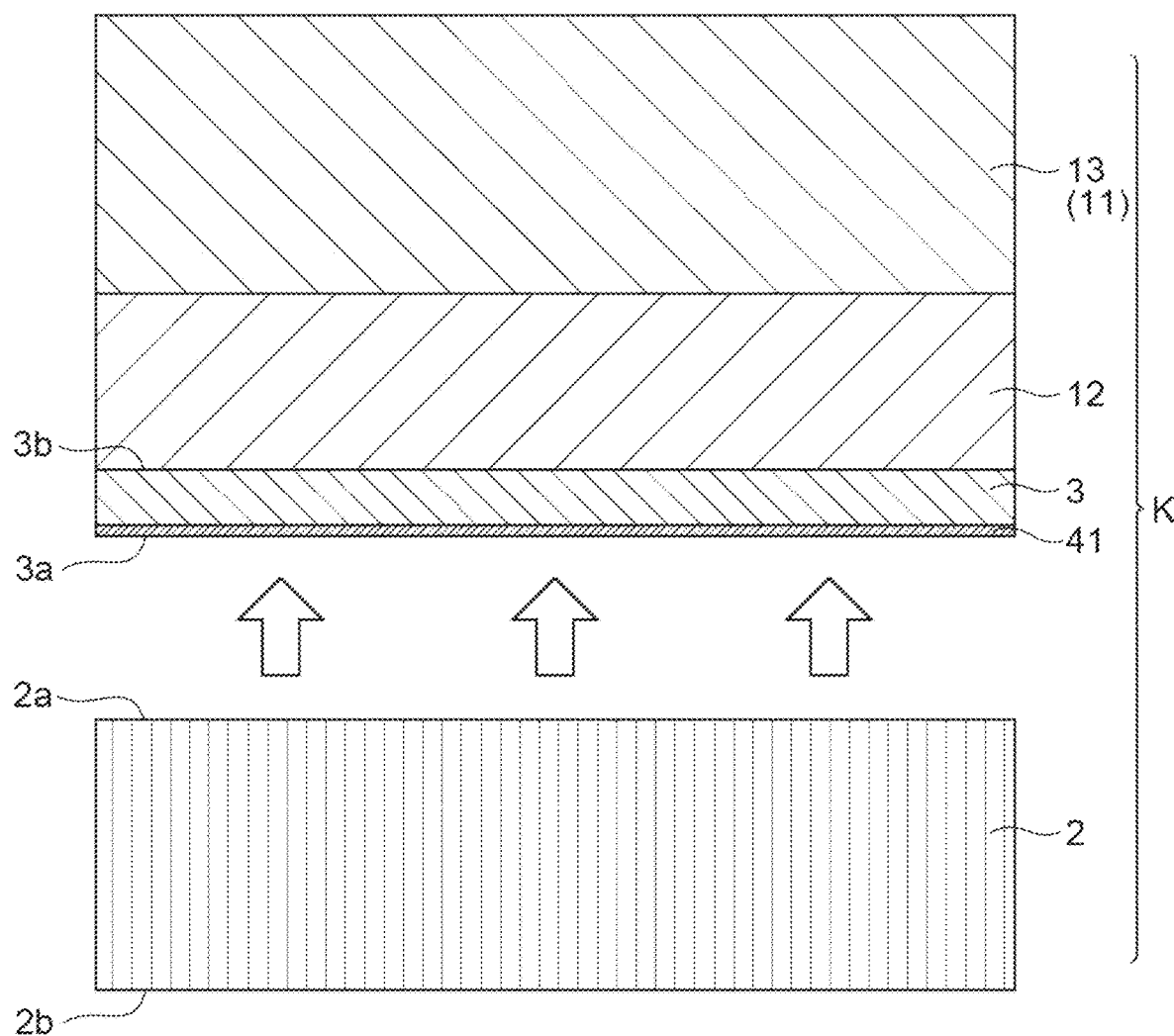
FIG. 15 is a schematic cross-sectional view showing an intermediate layer forming step.

FIG. 14 is a flowchart showing an example of a process for manufacturing a light-emitting element when forming an intermediate layer. As shown in the diagram, the process for manufacturing the light-emitting element 1 in this case includes an intermediate layer forming step (step S05) between the light-emitting layer forming step and the bonding step. The intermediate layer forming step is a step of forming the intermediate layer 41 on at least one of the fiber optic plate substrate 2 and the light-emitting layer 3. In the example of FIG. 15, the intermediate layer 41 is formed on the light-emitting layer 3 side in the intermediate layer forming step, and then the one surface 3a of the light-emitting layer 3 formed by the intermediate layer 41 and the incidence surface 2a of the fiber optic plate substrate 2 are thermocompression-bonded to each other. In the intermediate layer forming step, the intermediate layer 41 may be formed on the fiber optic plate substrate 2 side. When the intermediate layer 41 includes a plurality of layers, some of the layers may be formed on the light-emitting layer 3 side and the remaining layers may be formed on the fiber optic plate substrate 2 side.

REFERENCE SIGNS LIST

1: light-emitting element, 2: fiber optic plate substrate, 3: light-emitting layer, 4: metal layer, 6: GaN layer (nitride semiconductor layer), 7: InGaN layer (nitride semiconductor layer), 11: auxiliary substrate, 12: buffer layer, 13: sapphire substrate (auxiliary substrate), 21 (21A to 21C): optical detection module, 22: photodetector, 31: scanning electron microscope, 32: electron beam source, e1: primary electron beam, e2: secondary electron beam, 33: detection optical system, 41: intermediate layer, R: bonding surface.

The invention claimed is:

1. A light-emitting element, comprising:
 a fiber optic plate substrate having transparency to fluorescence; and
 a light-emitting layer as a nitride semiconductor layer having a quantum well structure,
 wherein the fiber optic plate substrate and the light-emitting layer are directly bonded to each other.

2. The light-emitting element according to claim 1,
 wherein the fiber optic plate substrate and the light-emitting layer are bonded to each other by thermocompression bonding.

3. The light-emitting element according to claim 1, wherein the fiber optic plate substrate and the light-emitting layer are bonded to each other by room temperature bonding.

4. The light-emitting element according to claim 1, wherein constituent elements of the light-emitting layer are diffused into the fiber optic plate substrate.

5. The light-emitting element according to claim 1, wherein the light-emitting layer has a laminated structure in which a GaN layer and an InGaN layer are alternately laminated.

6. The light-emitting element according to claim 1, wherein a metal layer is provided on a surface of the light-emitting layer on a side opposite to a bonding surface between the fiber optic plate substrate and the light-emitting layer.

7. The light-emitting element according to claim 1, wherein, on at least one of the fiber optic plate substrate and the light-emitting layer at a bonding surface between the fiber optic plate substrate and the light-emitting layer, an intermediate layer whose refractive index for the fluorescence is a refractive index between the fiber optic plate substrate and the light-emitting layer is provided.

8. The light-emitting element according to claim 7, wherein the intermediate layer is a SiN layer, a $Ta_3O_5$ layer, a $HfO_2$ layer, or a combination thereof.

9. An optical detection module, comprising:
the light-emitting element according to claim 1; and
a photodetector arranged on the fiber optic plate substrate side with respect to the light-emitting element.

10. The optical detection module according to claim 9, wherein the photodetector is formed by a solid state detection element or an electron tube device.

11. A scanning electron microscope, comprising:
an electron beam source that emits a primary electron beam toward a sample;
the light-emitting element according to claim 1 that generates fluorescence in response to incidence of a secondary electron beam generated in the sample by emission of the primary electron beam; and
a detection optical system that detects the fluorescence generated by the light-emitting element.

12. A method for manufacturing a light-emitting element, comprising:
a light-emitting layer forming step in which a buffer layer and a light-emitting layer as a nitride semiconductor layer having a quantum well structure are crystal-grown on an auxiliary substrate;
a bonding step in which a fiber optic plate substrate having transparency to fluorescence and the light-emitting layer on the auxiliary substrate are directly bonded to each other to form a bonded body; and
a removing step in which the auxiliary substrate and the buffer layer are removed from the bonded body.

13. The method for manufacturing a light-emitting element according to claim 12, wherein the light-emitting layer has a laminated structure in which a GaN layer and an InGaN layer are alternately laminated, and
the buffer layer is a GaN layer.

14. The method for manufacturing a light-emitting element according to claim 12, wherein a metal layer forming step in which a metal layer is formed on a surface of the light-emitting layer on a side opposite to a bonding surface between the fiber optic plate substrate and the light-emitting layer is included after the removing step.

15. The method for manufacturing a light-emitting element according to claim 12, wherein an intermediate layer forming step in which an intermediate layer whose refractive index for the fluorescence is a refractive index between the fiber optic plate substrate and the light-emitting layer is formed on at least one of the fiber optic plate substrate and the light-emitting layer is included between the light-emitting layer forming step and the bonding step.

16. The method for manufacturing a light-emitting element according to claim 15, wherein the intermediate layer is a SiN layer, a $Ta_3O_5$ layer, a $HfO_2$ layer, or a combination thereof.

* * * * *